United States Patent [19]

Yaguchi et al.

[11] Patent Number: 4,551,397
[45] Date of Patent: Nov. 5, 1985

[54] ZINC SILICATE PHOSPHOR AND ELECTRON EXCITED FLUORESCENT DISPLAY DEVICE USING THE PHOSPHOR

[75] Inventors: Masachika Yaguchi; Tomoki Mikami; Takashi Hase, all of Odawara, Japan

[73] Assignee: Kasei Optonix, Ltd., Tokyo, Japan

[21] Appl. No.: 596,387

[22] Filed: Apr. 3, 1984

[30] Foreign Application Priority Data

Apr. 4, 1983 [JP] Japan ................................. 58-58987
Jun. 27, 1983 [JP] Japan ............................... 58-115396

[51] Int. Cl.$^4$ ............................................. C09K 11/44
[52] U.S. Cl. .................................... 428/691; 428/690; 252/301.6 F; 252/301.6 P; 252/301.6 S; 313/467; 313/468
[58] Field of Search ................. 252/301.6 F, 301.6 P, 252/301.6 S; 313/467, 468; 428/690, 691

[56] References Cited

U.S. PATENT DOCUMENTS 2,169,046  8/1939  Headrick ...................... 252/301.6 F
2,314,699  3/1943  Hale ............................. 252/301.6 F
4,315,190  2/1982  Peters et al. .................. 252/301.6 F

FOREIGN PATENT DOCUMENTS 10676  4/1982  Japan .

OTHER PUBLICATIONS

Royce "RCA Technical Notes"-RCA TN No. 117.

Primary Examiner—Jack Cooper
Attorney, Agent, or Firm—Oblon, Fisher, Spivak, McClelland & Maier

[57] ABSTRACT

A zinc silicate phosphor represented by the formula:

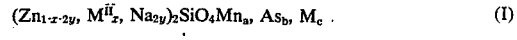

$$(Zn_{1-x-2y}, M^{II}_x, Na_{2y})_2SiO_4Mn_a, As_b, M_c \quad (I)$$

where $M^{II}$ is at least one element selected from the group consisting of barium, calcium and strontium, M is at least one of antimony and bismuth, and x, y, a, b and c satisfy the conditions of $0 \leq x \leq 5 \times 10^{-2}$, $0 \leq 2y \leq 5 \times 10^{-3}$, $5 \times 10^{-5} \leq a \leq 3 \times 10^{-2}$, $0 \leq b \leq 5 \times 10^{-3}$ and $0 < c \leq 1 \times 10^{-2}$, respectively (provided $x + 2y \neq 0$).

15 Claims, 5 Drawing Figures

ZINC SILICATE PHOSPHOR AND ELECTRON EXCITED FLUORESCENT DISPLAY DEVICE USING THE PHOSPHOR

The present invention relates to a zinc silicate phosphor, and particularly to a long after-glow green emitting zinc silicate phosphor which is capable of maintaining fluorescence under excitation for a long period of time. Further, the present invention relates also to an electron excited fluorescent display device wherein such a phosphor is used as a green emitting component of the fluorescent screen.

Recently, electron excited fluorescent display devices such as cathode ray tubes (CRTs) and low-velocity electron excited fluorescent display devices are used for various purposes, and there is a strong demand for a phosphor exhibiting good after-glow after supply of excitation energy thereto is stopped. For example, in terminal display units of a computer system for displaying fine characters and figures, display units of an aircraft control system, and the like, it is desired to use a CRT exhibiting high resolution. As an effective method of improving the resolution of the CRT, it is known to reduce the diameter of the electron beam and the frame frequency of the CRT. Namely, by reducing the frame frequency of approximately 55 Hz in ordinary CRTs such as television CRTs to approximately 30 Hz, it is possible to expand the signal frequency band by approximately two times that of ordinary CRTs thereby to increase the resolution.

The fluorescent screen of the high resolution CRT as described above should be constituted by a phosphor exhibiting long after-glow. This is because, if the fluorescent screen of the CRT is constituted by a short after-glow phosphor, the image displayed on the fluorescent screen flickers undesirably due to a low scanning speed on the fluorescent screen. In general, it is necessary for the phosphor constituting the fluorescent screen of the high resolution CRT to exhibit an after-glow period several tens of times to several hundreds of times longer than the after-glow period of the short after-glow phosphor which constitutes the fluorescent screen of the ordinary CRTs. The term "after-glow period" as used herein means the time required for the emission luminance to decrease to 10% of the emission luminance under excitation after the excitation of the phosphor is stopped, i.e. the 10% luminance after-glow period.

In order to provide high resolution CRTs having superior image reproduction capability, the present applicants have previously proposed novel long after-glow blue emitting phosphors and long after-glow green to orange emitting phosphors (Japanese Unexamined Patent Publication Nos. 129083/1983 and 142970/1983) and have further proposed improvements of conventional long after-glow red emitting phosphors and long after-glow green emitting phosphors (Japanese Unexamined Patent Publication Nos. 121258/1981, 136873/1981, 40380/1983 and 151322/1983). They have also studied CRTs wherein these phosphors are used for the fluorescent screens (Japanese Unexamined Patent Publication No. 129084/1983). However, color drift attributable to the degradation of a certain phosphor is a serious problem for the development of the above CRTs for practical use. It is therefore extremely important to overcome this problem.

As green emitting zinc silicate phosphors with long after-glow, there have been known manganese and arsenic-activated zinc silicate phosphor (P39 phosphor) and manganese-activated zinc silicate phosphor (P1 phosphor) as well as manganese, arsenic, antimony, etc. activated zinc silicate phosphors proposed earlier by the present applicants (see Japanese Unexamined Patent Publication No. 151322/1983) and zinc silicate phosphors disclosed in Japanese Unexamined Patent Publication No. 10676/1982.

These phosphors are zinc silicate phosphors containing manganese as the main activator and represented by the formula:

$Zn_2SiO_4:Mn, As_p, M_q$ where M is at least one of antimony and bismuth, and p and q include zero. (These phosphors will be hereinafter referred to simply as "zinc silicate phosphors".)

These zinc silicate phosphors are regarded as being especially excellent among the long after-glow green emitting phosphors from the viewpoints of both the emission luminance and the after-glow period. Accordingly they are used most abundantly.

However, as the practical application to CRTs, etc. has progressed in recent years, there has been a strong desire to develop a phosphor which is less susceptible to burning or a decrease of fluorescence of the phosphor even when maintained under excitation for a long period of time.

As opposed to ordinary cathode ray tubes for television, high resolution CRTs are often used to display the same image for an extended period of time, whereby burning of the phosphor is likely to take place and consequently the luminance on the same image tends to be uneven.

Further, it is the main cause for the formation of color drift that a silicate-type green emitting phosphor represented by the formula $Zn_2SiO_4:Mn(As)$ used to be employed as the green emitting phosphor (most sensitive to the visual sensitivity) for CRTs.

This will be explained with reference to the accompanying drawings.

Figure 1:
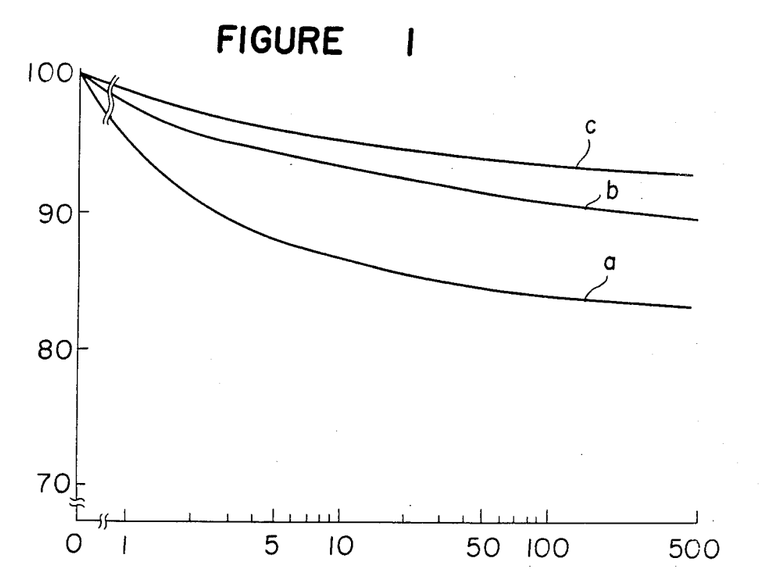

FIG. 1 is a graph illustrating the changes, with time, of fluorescence of fluorescent screens of CRTs under excitation by electron beams. In the Figure, curve a represents the case of the above-mentioned $Zn_2SiO_4:Mn(As)$ phosphor, i.e. the conventional phosphor.

It is evident from the curve a that when the above-mentioned $Zn_2SiO_4:Mn(As)$ phosphor is used as a green emitting phosphor for CRT, the luminance will be degraded considerably by electron beams. Accordingly, if the CRT is used for an extended period of time, there will be problems such that color drift will be caused and the CRT becomes no longer useful.

Further, the above-mentioned $Zn_2SiO_4:Mn(As)$ phosphor has poor application characteristics. Particularly when it is used in combination with other phosphors, it is difficult to obtain a uniform fluorescent screen unless the mixture is subjected to strong ball milling for a long period of time.

Figure 2:
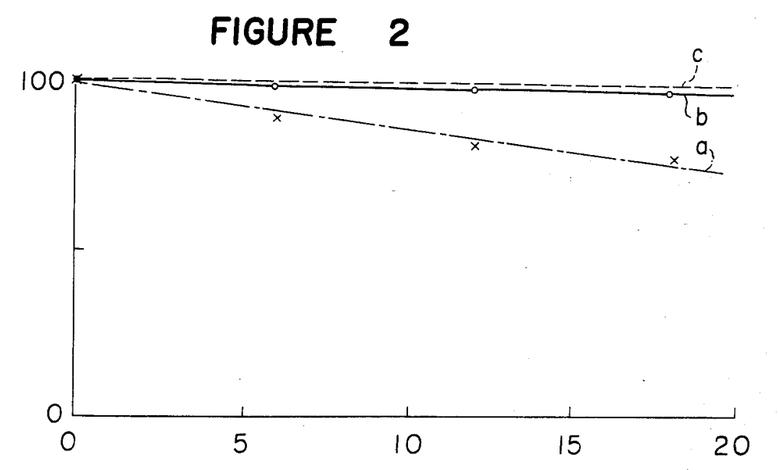
FIG. 2 is a graph illustrating the changes, with time, of fluorescence of phosphors based on the mixing time by ball milling. Curves a, b and c represent cases of a sulfide-type blue emitting phosphor, a silicate-type green emitting phosphor used in a conventional high resolution CRT and a phosphate-type red emitting phosphor, respectively.

FIG. 2 is a graph illustrating the changes, with time, of fluorescence of the phosphors based on the mixing time by ball milling. In the FIGURE, curves a, b and c represent the cases of a sulfide-type blue emitting phosphor, the above-mentioned silicate-type green emitting phosphor and a phosphate-type red emitting phosphor.

It is evident from FIG. 2 that when subjected to strong ball milling, some of the phosphors (particularly the sulfide phosphor) undergo considerable degradation of luminance as shown by the curve a in FIG. 2, whereby the CRT gives rise to color drift.

Accordingly, it is an object of the present invention to provide a long after-glow green emitting zinc sulfide phosphor which undergoes a minimum decrease of the fluorescence due to the above-mentioned burning.

Another object of the present invention is to provide an electron excited fluorescent display device which is free from color drift which used to be created during the use for an extended period of time or by reason of the production line.

The present inventors have conducted various studies on the zinc silicate phosphors to accomplish the above objects. As a result, it has been found that the above objects can be attained by incorporating a certain amount of at least one element of barium, calcium, strontium and sodium, into the above-mentioned specific zinc silicate phosphor. The present invention is based on this discovery.

Thus, the present invention provides a zinc silicate phosphor represented by the formula:

$(Zn_{1-x-2y}, M^{II}_x, Na_{2y})_2SiO_4:Mn_a, As_b, M_c$     (I)

where $M^{II}$ is at least one element selected from the group consisting of barium, calcium and strontium, M is at least one of antimony and bismuth, and x, y, a, b and c satisfy the conditions of $0 \leq x \leq 5 \times 10^{-2}$, $0 \leq 2y \leq 5 \times 10^{-3}$, $5 \times 10^{-5} \leq a \leq 3 \times 10^{-2}$, $0 \leq b \leq 5 \times 10^{-3}$ and $0 < c \leq 1 \times 10^{-2}$, respectively (provided $x + 2y \neq 0$).

Further, the present invention provides an electron excited fluorescent display device having a fluorescent screen, wherein the above-mentioned zinc silicate phosphor of the formula I is used as a green emitting component of the fluorescent screen.

Now, the present invention will be described in detail with reference to the preferred embodiments.

In the accompanying drawings, FIG. 1 is a graph illustrating the changes, with time, of fluorescence of fluorescent screens. Curves a and b represent cases of green emitting phosphor layers of conventional high resolution CRTs, and curve c represents a case of the green emitting phosphor layer of a high resolution CRT of the present invention.

The phosphors of the present invention may be prepared in accordance with the following process.

Firstly, as the phosphor raw materials, there will be employed:

(i) zinc oxide (ZnO) or a zinc compound which is capable of being readily converted to ZnO at a high temperature, such as zinc carbonate or zinc oxalate;

(ii) silicon dioxide ($SiO_2$) or a silicon compound which is capable of being readily converted to $SiO_2$ at high temperature, such as ethyl silicate or silicic acid;

(iii) manganese oxide or a manganese compound which is capable of being readily converted to manganese oxide at high temperature, such as manganese metal, manganese carbonate, a manganese halide, manganese nitrate or manganese sulfide;

(iv) arsenic oxide or an arsenic compound which is capable of being readily converted to arsenic oxide at a high temperature, such as arsenic metal or an arsenic halide;

(v) at least one compound selected from the group consisting of antimony compounds and bismuth compounds such as their oxides or halides;

(vi) at least one compound selected from the group consisting of barium, calcium and strontium compounds such as their oxides, halides and carbonates; and (vii) at least one sodium compound such as sodium oxide, a sodium halide or sodium carbonate.

The above-mentioned phosphor raw materials are respectively weighed to satisfy stoichiometrically the formula:

$(Zn_{1-x-2y}, M^{II}_x, Na_{2y})_2SiO_4:Mn_a, As_b, M_c$     (I)

where $M^{II}$ is at least one element selected from the group consisting of barium (Ba), calcium (Ca) and strontium (Sr), M is at least one of antimony (Sb) and bismuth (Bi), and x, y, a, b and c satisfy the conitions of $0 \leq x \leq 5 \times 10^{-2}$, $0 \leq 2y \leq 5 \times 10^{-3}$, $5 \times 10^{-5} \leq a \leq 3 \times 10^{-2}$, $0 \leq b \leq 5 \times 10^{-3}$ and $0 < c \leq 1 \times 10^{-2}$, respectively (provided $x + 2y \neq 0$), and then thoroughly mixed to obtain a mixture of the phosphor raw materials. The mixing may be conducted in a dry system by means of e.g. a ball mill, a mixer mill or a mortar, or may be conducted in a wet system i.e. in a paste state by using water, an alcohol or a weak acid as the medium.

In the preparation of the phosphor, a flux may be added to the above-mentioned mixture of phosphor raw materials for the purpose of improving the emission luminance and the powdery nature of the phosphor thereby obtained.

Further, the above-mentioned raw materials (v), (vi) and (vii) tend to evaporate when fired at a high temperature, and they may be incorporated more or less in an excess amount depending upon the temperature and time for the firing.

Then, the above-mentioned mixture of phosphor raw materials is filled in a heat resistant container such as an aluminum crucible or a quartz crucible, and subjected to firing. The firing is usually conducted from one to a few times (i.e. 3–4 times) in the air (i.e. in an oxidative atmosphere), in a neutral atmosphere such as a nitrogen gas atmosphere or an argon gas atmosphere, or in a reducing atmosphere such as a nitrogen gas atmosphere containing a small amount of hydrogen gas or a carbon atmosphere, at a temperature of from 1000° to 1350° C., preferably from 1200° to 1300° C. Better results are obtainable by subjecting the above phosphor matrix material to preliminary firing at a temperature of from 500° to 1300° C. so that the matrix material undergoes grain growth.

The firing time may be varied depending upon the amount of the mixture of the phosphor raw materials filled in the heat resistant container and the firing temperature employed. However, it is usually from 0.5 to 6 hours, preferably from 1 to 4 hours, when the firing temperature is within the above-mentioned range. After the firing, the fired product is treated by various operations which are commonly employed for the production of phosphors, such as pulverization, washing (which may be conducted by means of water, a weak mineral acid, a weak alkaline solution or a weak organic acid), drying and sieving, whereby a phosphor of the present invention will be obtained.

The phosphor of the present invention thus obtained and the conventional zinc silicate phosphor (as a reference) are respectively uniformly coated on face plates by a precipitation coating method to obtain fluorescent screens, and then display tubes were prepared in accordance with a conventional method for the preparation of a green emitting monochrome display tube. With use of these display tubes, fluorescence degradation characteristics under continuous excitation of the fluorescent screens were measured. The results are shown in FIG. 1.

Referring to FIG. 1, curves a and b represent the cases of display tubes prepared by using the conventional $Zn_2SiO_4$:Mn, As phosphor and $(Zn, Ba, Na_2)_2 SiO_4$:Mn, As phosphor, respectively. Curve c represents the case of a display tube prepared by using a $(Zn, Ba, Na_2)_2SiO_4$:Mn, As, Sb phosphor according to the present invention.

As is evident from FIG. 1, the zinc silicate phosphors of the present invention show considerably less degradation of the fluorescence under excitation for a long period of time (i.e. a considerably smaller decrease of the fluorescence) than the conventional zinc silicate phosphor.

As shown by this Figure, the phosphors of the present invention give better effectiveness when antimony (Sb) is combined with at least one element of barium, calcium, strontium and sodium.

The ranges of the amounts (value b and value c) of As and M are $0 \leq b \leq 5 \times 10^{-3}$ and $0 < c \leq 1 \times 10^{-2}$, respectively, for the same reasons (e.g. luminance and grain size) as explained by the present applicants in earlier Japanese Unexamined Patent Publication No. 151322/1983. However, from the viewpoints of the luminance, after-glow and grain size, the ranges of $1 \times 10^{-5} \leq b \leq 2 \times 10^{-3}$ and $1 \times 10^{-5} \leq c \leq 5 \times 10^{-3}$ are particularly preferred.

On the other hand, the content of at least one element selected from the group consisting of barium, calcium, strontium and sodium, to be incorporated in the present invention, is specified to obtain the effectiveness of the present invention.

Namely, the constent (value x) of $M^{II}$ is restricted to the range of $0 \leq x \leq 5 \times 10^{-2}$. If $x > \times 10^{-2}$, it is not only impossible to obtain the effectiveness of the present invention, but also likely to lead to various adverse effects. For instance, as shown in FIG. 3 illustrating the relation between the barium content and the fluorescence-maintaining rate, undesirable results appear when the barium content is outside the above specified range.

Figure 3:
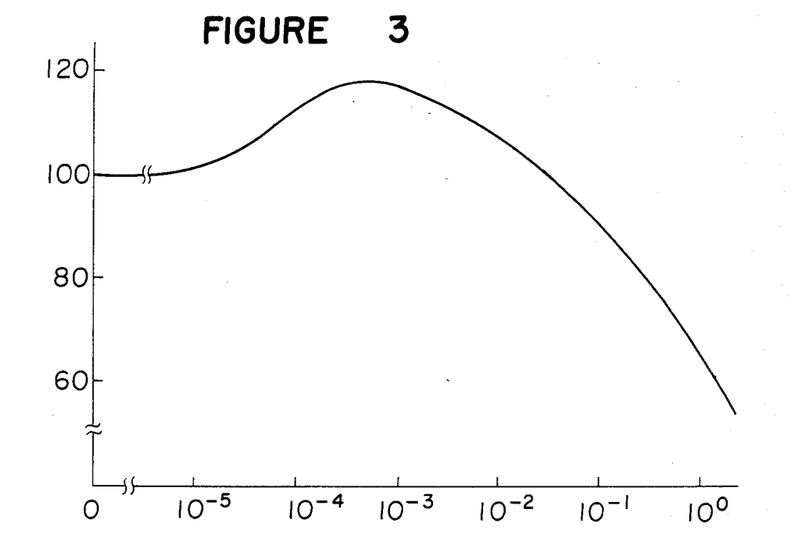
FIG. 3 shows the significance of the $M^{II}$ content in the green emitting phosphor in the present invention, i.e. the significance that the value x must be within the specific range.

The fluorescence-maintaining rate in FIG. 3 was measured in such a manner that fluorescent screens made of zinc silicate phosphors having various barium contents were subjected, without application of aluminum vapour deposition, to an accelerated ageing test by applying continuous irradiation of cathode rays for 17 minutes at an acceleration voltage of 20 KV at a current density of 10 $\mu A/cm^2$, and the fluorescence-maintaining rate after the accelerated ageing test (i.e. the fluroescence relative to the so-called initial fluorescence prior to the accelerated ageing test) was measured and represented by the relative fluorescence based on the value 100 when $x=0$.

As shown in FIG. 3, the effect of the present invention is obtainable when the barium content (value x) is $0 < x \leq 5 \times 10^{-2}$. The effect is particularly distinct when the barium content is $2 \times 10^{-5} \leq x \leq 1 \times 10^{-2}$.

Substantially the same relation as between this value x and the relative fluorescence was obtained also in the cases of strontium and calcium.

Figure 4:
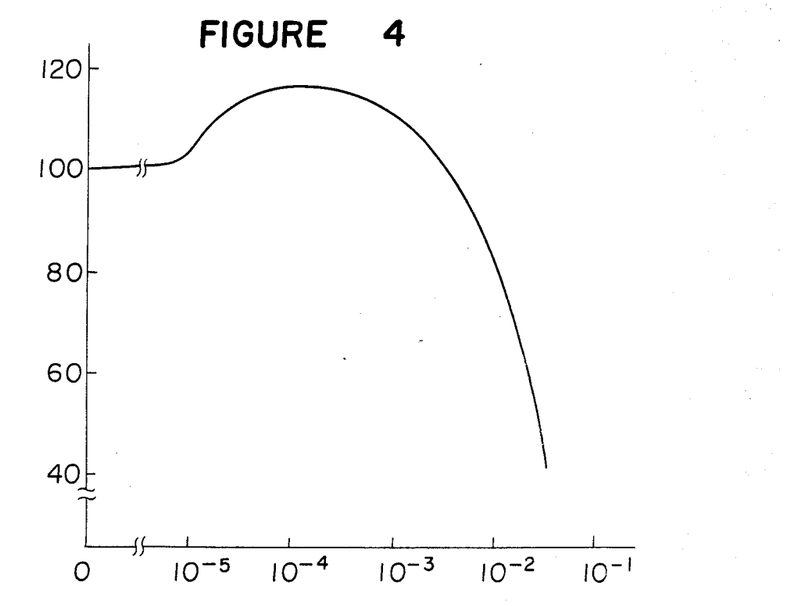
FIG. 4 shows the significance of the sodium content in the green emitting phosphor in the present invention, i.e. the significance that the value 2y must be within the specific range.

Further, FIG. 4 shows the relation between the sodium content (value 2y) and the fluorescence-maintaining rate, in a manner similar to FIG. 3. As is evident from FIG. 4, the effect of the present invention is observed under the condition of $0 < 2y \leq 5 \times 10^{-3}$. On the other hand, under the condition of $2y > 5 \times 10^{-3}$, it is not only impossible to obtain the effect of the present invention, but also likely to lead to adverse effects by the incorporation of sodium. Particularly distinct effect is obtainable when the sodium content is $1 \times 10^{-5} \leq 2y \leq 2 \times 10^{-3}$.

As mentioned above, according to the present invention, various superior effects of the present invention can be obtained by incorporating the specified amount of at least one element selected from the group consisting of barium, calcium, strontium and sodium. However, it is most preferred to use barium from the viewpoints of other properties required for the phosphor, such as from the viewpoint of coagulation.

In the phosphors of the present invention, a part of zinc may be substituted by magnesium, a part of silicon by germanium, a part of sodium by at least one element selected from the group consisting of potassium, rubidium and cesium. Further, trace amounts of lead, europium, phosphorus, boron, aluminum, beryllium and cadmium may be incorporated.

As mentioned above, the phosphors of the present invention are particularly suitable for use as a green emitting phosphor for display cathode ray tubes by virtue of the excellent fluorescence-maintaining rate. Further, a pigment such as a black or green pigment may be incorporated to improve the contrast, as the case requires. Furthermore, the phosphor of the present invention may be used in combination with other long or short after-glow green emitting phosphors to adjust the emitting color or the after-glow characteristics. Particularly, the phosphor of the present invention may be combined with a short after-glow phosphor such as a zinc-activated zinc oxide phosphor or P46 phosphor.

On the other hand, the electron excited fluorescent display device of the present invention is a display tube wherein an image is produced by excitation with electron beams and wherein the above-mentioned long after-glow green emitting phosphor of the present invention is used as the essential element of the green emitting component of the fluorescent screen.

Such an electron excited fluorescent display device includes, for instance, a cathode ray tube such as a color television cathode ray tube or a monochrome cathode ray tube, and a fluorescent display tube which is excited by low velocity electron beams.

Now, the electron excited fluorescent display device of the present invention will be described in detail with reference to a high resolution color cathode ray tube as a typical example.

Namely, the high resolution color cathode ray tube of the present invention is characterized by its fluorescent screen which comprises:

(I) a green emitting phosphor composed essentially of a zinc silicate phosphor represented by the formula:

$$(Zn_{1-x-2y}, M^{II}_x, Na_{2y})_2SiO_4:Mn_a, As_b, M_c \quad (I)$$

where $M^{II}$ is at least one element selected from the group consisting of barium, calcium and strontium, M is at least one of antimony and bismuth, and x, y, a, b and c satisfy the conditions of $0 \leq x \leq 5 \times 10^{-2}$, $0 \leq 2y \leq 5 \times 10^{-3}$, $5 \times 10^{-5} \leq a \leq 3 \times 10^{-2}$, $0 \leq b\, 5 \times 10^{-3}$ and $0 < c \leq 1 \times 10^{-2}$, respectively (provided $x + 2y \neq 0$), and having a 10% after-glow period of from 5 to 150 milliseconds;

(II) a red emitting phosphor composed essentially of a long after-glow red to orange emitting phosphor having a 10% after-glow period of at least 5 milliseconds and having a 10% after glow period of from 5 to 150 milliseconds;

(III) a blue to bluish white emitting phosphor having a 10% after-glow period of from 5 to 150 milliseconds.

The green emitting phosphor to be used in the present invention is composed essentially of a zinc silicate phosphor represented by the formula: $(Zn_{1-x-2y}, M^{II}_x, Na_{2y})_2SiO_4:Mn_a, As_b, M_c$, where $M^{II}$ is at least one alkaline earth metal selected from the group consisting of barium, calcium and strontium, M is at least one of antimony and bismuth, and x, y, a, b and c satisfy the conditions of $0 \leq x \leq 5 \times 10^{-2}$, $0 \leq 2y \leq 5 \times 10^{-3}$, $5 \times 10^{-5} \leq a \leq 3 \times 10^{-2}$, $0 \leq b \leq 5 \times 10^{-3}$ and $0 < c \leq 1 \times 10^{-2}$, respectively, (provided $y + 2y = 0$, this condition must always be satisfied even when omitted hereinafter). It is particularly preferred to use the zinc silicate phosphor wherein b and c satisfy the conditions of $1 \times 10^{-5} \leq b \leq 2 \times 10^{-3}$ and $1 \times 10^{-5} \leq c \leq 5 \times 10^{-3}$.

The above green emitting phosphor may contain, as the case requires, other long after-glow green emitting phosphor comprising zinc sulfide as the matrix, either one of copper or copper and gold as an activator, at least one of gallium and indium as a first coactivator and at least one element selected from the group consisting of chlorine, bromine, iodine, fluorine and aluminum as a second coactivator, with the amounts of the activator, the first coactivator and the second activator being from $10^{-4}$ to $10^{-1}$% by weight, from $10^{-6}$ to $10^{-1}$ by weight and from $5 \times 10^{-6}$ to $5 \times 10^{-2}$% by weight, respectively relative to the matrix, or a short after-glow green emitting phosphor such as a copper and aluminum activated or copper and halogen activated zinc sulfide phosphor. Thus, the green emitting phosphor to be used in the present invention is prepared by a single phosphor or by a mixture of phosphors, to have a 10% after-glow period of from 5 to 150 milliseconds.

The red emitting phosphor to be used in the present invention is the one composed essentially of a long after-glow orange to red emitting phosphor having a 10% after-glow period of at least 5 milliseconds. As such a long after-glow orange to red emitting phosphor, there may be mentioned phosphors such as a manganese-activated orthophosphate phosphor represented by the formula:

$$(Zn_{1-z}, Mg_z)_3(PO_4)_2:Mn_i, M_j, M'_k \quad (II)$$

where M is at least one element selected from the group consisting of calcium, strontium, barium, beryllium, zirconium and tin, M' is at least one element selected from the group consisting of arsenic and lead, and i, j, k and z are numerical values satisfying the conditions of $5 \times 10^{-4} \leq i \leq 10^{-1}$, $0 \leq j \leq 10^{-1}$, $0 \leq k \leq 10^{-1}$ and $0 \leq z < 1$, respectively and which may contain, as the case requires, from 10 to 1000 ppm of at least one element selected from the group consisting of sodium, lithium and potassium, a manganese-activated silicate phosphor [such as a manganese-activated magnesium silicate red emitting phosphor ($MgSiO_3:Mn$) or a manganese and lead activated calcium silicate orange emitting phosphor ($CaSiO_3:Mn, Pb$)], a manganese-activated cadmium chlorophosphate orange emitting phosphor [$3Cd_3(PO_4)_2 \cdot CdCl_2:Mn$], a europium-activated indium borate phosphor, a europium-activated rare earth oxide phosphor [such as a europium-activated rare earth borate phosphor, a europium-activated or europium and dysprosium-activated rare earth oxide red emitting phosphor ($Ln_2O_3:Eu$ or $Ln_2O_3:Eu, Dy$, where Ln is at least one element selected from the group consisting of Y, Gd, La and Lu), a europium-activated rare earth vanadate phosphor, a europium-activated rare earth sulfide phosphor ($Ln_2O_2S:Eu$) or a europium-activated rare earth vanadate phosphor], and a manganese-activated fluoride phosphor [such as a manganese-activated potassium magnesium fluoride orange emitting phosphor ($KMgF_3:Mn$), or a manganese-activated magnesium fluoride red emitting phosphor ($MgF_2:Mn$)]. These phosphors may be combined with other short after-glow red to orange emitting phosphors as the case requires.

Thus, the red emitting phosphor to be used in the present invention is prepared by a single phosphor or by a mixture of phosphors to have a 10% after-glow period of from 5 to 150 milliseconds.

Further, in the present invention, a blue to bluish white emitting phosphor is used. The blue to bluish white emitting phosphor may be any phosphor so long as it has a 10% after-glow period of from 5 to 150 milliseconds.

As such a phosphor, particularly preferred are long after-glow blue to bluish white emitting phosphors represented by the formula:

$$ZnS:Ag, M_m, M', X \quad (III)$$

where M is at least one of copper and gold, M' is at least one element selected from the group consisting of gallium, indium and scandium, X is at least one element selected from the group consisting of fluorine, chlorine, bromine, iodine and aluminum, and m is a positive numerical value including zero (see Japanese Unexamined Patent Publication Nos. 120521/1983, 115024/1983 and 129083/1983). If necessary, short after-glow blue emitting phosphors (such as ZnS:Ag, Cl or AnS:Ag, Al) may further be incorporated thereto. Furthermore, a so-called light blue phosphor which is prepared by mixing a long after-glow green emitting phosphor and red emitting phosphor with a short after-glow blue emitting phosphor which used to be employed prior to the proposal of the above-mentioned long after-glow blue emitting phosphors by the present applicants, may also be used.

By the green emitting phosphor, the red emitting phosphor and the blue emitting phosphor, the respective image elements are formed to provide a color cathode ray tube of the present invention.

Further, if a fluorescent screen is made of a mixture of the above-mentioned three color phosphors, a black and white cathode ray tube of the present invention will be obtained.

On the other hand, a single color emitting cathode ray tube is obtained by preparing the fluorescent screen from the above-mentioned green emitting zinc silicate phosphor of the present invention.

Here, the term "single color emitting" means "green emitting" and does not mean a single emission spectrum. As the phosphor to be used for the fluorescent screen of the invention, the above-mentioned green emitting phosphor may be used in combination with other long after-glow or short after-glow green emitting phosphors with green emission spectra.

Furthermore, if necessary, a pigment may be incorporated in the respective color emitting component to improve the contrast.

Referring to FIG. 1 again, the Figure shows the changes, with time, of the fluorescence of the above-mentioned green emitting phosphors, which is most sensitive to the visual sensitivity of the human being among the various cathode ray tubes of the present invention.

In FIG. 1, curve c represents the changes, with time, of the fluorescence of the green emitting components of the cathode ray tubes of the present invention.

Namely, as is evident from FIG. 1, the zinc silicate phosphors of the present invention exhibit substantially less degradation of the fluorescence under excitation for a long period of time (i.e. a substantially smaller decrease of the fluorescence-maintaining rate) than the case (curve a) where the conventional zinc silicate phosphor was employed.

Further, as shown by this Figure, the green emitting phosphor of the present invention exhibits greater effectiveness when antimony (Sb) is combined with at least one element selected from the group consisting of barium, calcium, strontium and sodium.

Further, Table 1 shows the comparison of the fluorescence-maintaining rates as between the green emitting components of the cathode ray tubes of the present invention and the green emitting components of the conventional cathode ray tubes. As is evident also from this Table, the green emitting components of the cathode ray tubes of the present invention show superior fluorescence-maintaining rates to the green emitting components of the conventional cathode ray tubes.

Thus, according to the present invention, it is possible to obtain a reproduced image having high luminance without color shift or color drift.

TABLE 1

| Green emitting phosphors | Fluorescence-maintaining rates (%) of the green emitting phosphors Color CRTs |
|---|---|
| $(Zn_{0.999} Ba_{0.001})_2SiO_4:Mn_{0.008}, As_{0.002}, Sb_{0.0002}$ | 95 |
| $(Zn_{0.99985} Na_{0.00015})_2SiO_4:Mn_{0.004}, As_{0.004}, Bi_{0.002}$ | 94 |
| $(Zn_{0.99935} Ba_{0.005} Na_{0.00015})_2SiO_4:Mn_{0.008}, As_{0.0002}, Sb_{0.002}$ | 94 |
| $(Zn_{0.999} Ca_{0.001})_2SiO_4:Mn_{0.008}, As_{0.0002}, Sb_{0.002}$ | 93 |
| $(Zn_{0.999} Sr_{0.001})_2SiO_4:Mn_{0.008}, As_{0.0002}, Sb_{0.002}$ | 93 |
| $(Zn_{0.999} Ba_{0.001})_2SiO_4:Mn_{0.008}, Sb_{0.002}$ | 95 |
| $(Zn_{0.9985} Na_{0.00015})_2SiO_4:Mn_{0.008}, Sb_{0.002}$ | 95 |
| $Zn_2SiO_4:Mn_{0.008}, As_{0.0002}$ | 89 |
| $Zn_2SiO_4:Mn_{0.004}, As_{0.0004}$ | 89 |
| $Zn_2SiO_4:Mn_{0.008}$ | 88 |

The ranges of the amounts (value b and value c) of As and M are $0 \leq b \leq 5 \times 10^{-3}$ and $0 > c \leq 1 \times 10^{-2}$, respectively, for the above-mentioned reasons (e.g. luminance, after-glow and grain size distribution). The ranges of $1 \times 10^{-5} \leq b \leq 2 \times 10^{-3}$ and $1 \times 10^{-5} \leq c \leq 5 \times 10^{-3}$ are particularly preferred.

On the other hand, the content of at least one element selected from the group consisting of barium, calcium, strontium and sodium, to be incorporated in the zinc silicate phosphor, is specified to obtain the effectiveness of the present invention.

Namely, the content (value x) of $M^{II}$ is restricted to the range of $0 \leq x \leq 5 \times 10^{-2}$. If $x > 5 \times 10^{-2}$, it is not only impossible to obtain the effectiveness of the present invention, but also likely to lead to various adverse effects. For instance, as shown in FIG. 3 illustrating the relation between the barium content and the fluorescence-maintaining rate, undesirable results appear when the barium content is outside the above specified range.

The fluorescence-maintaining rate in Table 1 was measured in such a manner that fluorescent screens made of zinc silicate phosphors having various barium contents were subjected, without application of aluminum vapour deposition, to an accelerated ageing test by applying continuous irradiation of cathode rays for 17 minutes at an acceleration voltage of 20 KV at a current density of 10 $\mu A/cm^2$, and the fluorescence-maintaining rate after the accelerated ageing test (i.e. the fluroescence relative to the so-called initial fluorescence prior to the accelerated ageing test) was measured.

As shown in FIG. 3, the effect of the present invention is obtainable when the barium content (value x) is $0 < x \leq 5 \times 10^{-2}$. The effect is particularly distinct when the barium content is $2 \times 10^{-5} \leq x \leq 1 \times 10^{-2}$.

Substantially the same relation as between this value x and the relative fluorescence was obtained also in the cases of strontium and calcium.

Further, FIG. 4 shows the relation between the sodium content (value 2y) and the fluorescence-maintaining rate, in a manner similar to FIG. 3. As is evident from FIG. 4, the effect of the present invention is observed under the condition of $0 < 2y \leq 5 \times 10^{-3}$. On the other hand, under the condition of $2y > 5 \times 10^{-3}$, it is not only impossible to obtain the effect of the present invention, but also likely to lead to adverse effects by the incorporation of sodium. Particularly distinct effect is obtainable when the sodium content is $1\times 10^{-5} \leq 2y \leq 2\times 10^{-3}$.

As mentioned above, according to the present invention, various superior effects of the present invention can be obtained by incorporating the specified amount of at least one element selected from the group consisting of barium, calcium, strontium and sodium into the green emitting zinc silicate phosphor. However, it is most preferred to use barium from the viewpoints of other properties required for the phosphor, such as from the viewpoint of coagulation.

In the zinc silicate phosphor, a part of zinc may be substituted by magnesium, a part of silicon by germanium, a part of sodium by at least one element selected from the group consisting of potassium, rubidium and cesium. Further, trace amounts of lead, europium, phosphorus, boron, aluminum, beryllium and cadmium may be incorporated.

Thus, the zinc silicate green emitting phosphor to be used in the present invention has the following advantages over the conventional zinc silicate green emitting phosphors.

(i) It has remarkably superior characteristics with respect to the degradation of luminance.

(ii) Its coating characteristics are good. Accordingly, it is usually unnecessary to use a ball mill for mixing it with other phosphors.

Accordingly, the cathode ray tube of the present invention comprising the above specified green emitting phosphor, red emitting phosphor and blue emitting phosphor, does not show color drift even when used for a long period of time. Further, the degradation of the green emitting component which is most influential to the visual sensitivity, is minimum, and accordingly an image having high luminance is obtainable, whereby the effects to e.g. the electric circuit for the cathode ray tube were remarkably excellent.

Furthermore, the after-glow characteristics of the green, red and blue emitting components match one another to provide a good display with high resolution, and the drive circuit condition is optimum at a frame frequency of from 25 to 50 Hz.

Now, the present invention will be described in further detail with reference to Examples. However, it should be understood that the present invention is by no means restricted to these specific Examples.

EXAMPLE 1

| Zinc oxide | ZnO | 732 g |
| --- | --- | --- |
| Silicon dioxide | $SiO_2$ | 300 g |
| Arsenic trioxide | $As_2O_3$ | 0.1 g |
| Antimony trioxide | $Sb_2O_3$ | 2 g |
| Barium iodide | $BaI_2$ | 4.5 g |

The above identified raw materials were thoroughly pulverized and mixed in a mixer mill, then filled in an alumina crucible and fired in the air at 1300° C. for 2 hours. After the firing, the fired product was pulverized, and 3.75 g of manganese fluoride was added thereto. The mixture was again fired at 1300° C. for 2 hours. The fired products thus obtained, was pulverized and washed to obtain a phosphor of the present invention represented by the formula: $(Zn_{0.999}Ba_{0.001})_2SiO_4:Mn_{0.008}, As_{0.0002}, Sb_{0.002}$ A fluorescent screen was made from this phosphor and subjected to the above-mentioned accelerated ageing test, whereupon the fluorescence-maintaining rate was measured. The fluorescence-maintaining rate was 95%. Whereas, the fluorescence-maintaining rate of a $Zn_2SiO_4:Mn_{0.008}, As_{0.0002}$ phosphor prepared in the same manner, was 89%.

EXAMPLE 2

| ZnO | 730 g |
| --- | --- |
| $SiO_2$ | 310 g |
| $As_2O_3$ | 0.2 g |
| Bismuth trioxide ($Bi_2O_3$) | 2.3 g |
| Sodium fluoride (NaF) | 1.8 g |

A phosphor of the present invention represented by the formula $(Zn_{0.99985}Na_{0.00015})_2SiO_4:M_{0.004}, As_{0.0004}, Bi_{0.002}$, was prepared in the same manner as in Example 1 except that the above raw materials were employed.

This phosphor was subjected to an accelerated ageing test in the same manner as in Example 1, and the fluorescence-maintaining rate as measured after the accelerated ageing test, was 94%. Whereas, the fluorescence-maintaining rate of a $Zn_2SiO_4:Mn_{0.004}, As_{0.0004}$ phosphor prepared in the same manner, was 89%.

EXAMPLE 3

| ZnO | 732 g |
| --- | --- |
| $SiO_2$ | 300 g |
| $As_2O_3$ | 0.1 g |
| $Sb_2O_3$ | 2 g |
| $BaI_2$ | 2.6 g |
| NaF | 0.9 g |

A phosphor of the present invention represented by the formula $(Zn_{0.99935}Ba_{0.0005}Na_{0.00015})_2SiO_4:Mn_{0.008}, As_{0.0002}, Sb_{0.002}$, was prepared in the same manner as in Example 1 except that the above raw materials were employed.

This phosphor was subjected to an accelerated ageing test in the same manner as in Example 1, and the fluorescence-maintaining rate as measured after the accelerated ageing test, was 94%. Whereas, the fluorescence-maintaining rate of a $Zn_2SiO_4:Mn_{0.008}, As_{0.0002}$ phosphor prepared in the same manner, was 89%.

EXAMPLE 4

| ZnO | 732 g |
| --- | --- |
| $SiO_2$ | 300 g |
| $As_2O_3$ | 0.1 g |
| $Sb_2O_3$ | 2 g |
| $CaI_2\cdot 4H_2O$ | 4 g |

A phosphor of the present invention represented by the formula $(Zn_{0.999}Ca_{0.001})_2SiO_4:Mn_{0.008}, As_{0.0002}, Sb_{0.002}$, was prepared in the same manner as in Example 1 except that the above raw materials were employed.

This phosphor was subjected to an accelerated ageing test in the same manner as in Example 1, and the fluorescence-maintaining rate as measured after the accelerated ageing test, was 93%. Whereas, the fluorescence-maintaining rate of a $Zn_2SiO_4:Mn_{0.008}, As_{0.0002}$ phosphor prepared in the same manner, was 89%.

EXAMPLE 5

| ZnO | 732 g |
| --- | --- |
| $SiO_2$ | 300 g |
| $As_2O_3$ | 0.1 g |

|   |   |
|---|---|
| $Sb_2O_3$ | 2 g |
| $SrI_2 \cdot 6H_2O$ | 5 g |

A phosphor of the present invention represented by the formula $(Zn_{0.999}Sr_{0.001})_2SiO_4:Mn_{0.008}$, $As_{0.0002}$, $Sb_{0.002}$, was prepared in the same manner as in Example 1 except that the above raw materials were employed.

This phosphor was subjected to an accelerated ageing test in the same manner as in Example 1, and the fluorescence-maintaining rate as measured after the accelerated ageing test, was 93%. Whereas, the fluorescence-maintaining rate of a $Zn_2SiO_4:Mn_{0.008}$, $As_{0.0002}$ phosphor prepared in the same manner, was 89%.

EXAMPLE 6

|   |   |
|---|---|
| ZnO | 732 g |
| $SiO_2$ | 300 g |
| $Sb_2O_3$ | 1 g |
| $BaI_2$ | 4.5 g |

A phosphor of the present invention represented by the formula $(Zn_{0.999}Ba_{0.001})_2SiO_4:Mn_{0.008}$, $Sb_{0.002}$, was prepared in the same manner as in Example 1 except that the above raw materials were employed.

This phosphor was subjected to an accelerated ageing test in the same manner as in Example 1, and the fluorescence-maintaining rate as measured after the accelerated ageing test, was 95%. Whereas, the fluorescence-maintaining rate of a $Zn_2SiO_4:Mn_{0.008}$, $As_{0.0002}$ phosphor prepared in the same manner, was 89%.

EXAMPLE 7

|   |   |
|---|---|
| ZnO | 732 g |
| $SiO_2$ | 300 g |
| $Sb_2O_3$ | 1 g |
| NaF | 1.8 g |

A phosphor of the present invention represented by the formula $(Zn_{0.99985}Na_{0.00015})_2SiO_4:Mn_{0.008}$, $Sb_{0.002}$, was prepared in the same manner as in Example 1 except that the above raw materials were employed.

This phosphor was subjected to an accelerated ageing test in the same manner as in Example 1, and the fluorescence-maintaining rate as measured after the accelerated ageing test, was 95%. Whereas, the fluorescence-maintaining rate of a $Zn_2SiO_4:Mn_{0.008}$, $As_{0.0002}$ phosphor prepared in the same manner, was 88%.

EXAMPLE 8

A green emitting phosphor represented by the formula $(Zn_{0.999}Ba_{0.001})_2SiO_4:Mn_{0.008}$, $As_{0.0002}$, $Sb_{0.0002}$ was prepared in the same manner as in Example 1. This phosphor had a after-glow period of 70 milliseconds.

Whereas, the conventional $Zn_2SiO_4:Mn_{0.008}$, $As_{0.0002}$ phosphor prepared in the same manner, had an after-glow period of 54 milliseconds.

35 Percent by weight of the green emitting phosphor of the present invention, 13% by weight of a ZnS:Ag, Ga, Cl phosphor, as a blue emitting phosphor, having an after-glow period of 30 milliseconds and composed mainly of cubic system crystals and 52% by weight of a $(Zn, Mg)_3(PO_4)_2:Mn$ phosphor as a red emitting phosphor having an after-glow period of 133 milliseconds, were uniformly mixed to obtain a white emitting phosphor.

This phosphor was uniformly coated on a face plate by a precipitation coating method to form a fluorescent screen, and then a black and white cathode ray tube of the present invention was prepared in accordance with the conventional method for the production of black and white cathode ray tubes.

Figure 5:
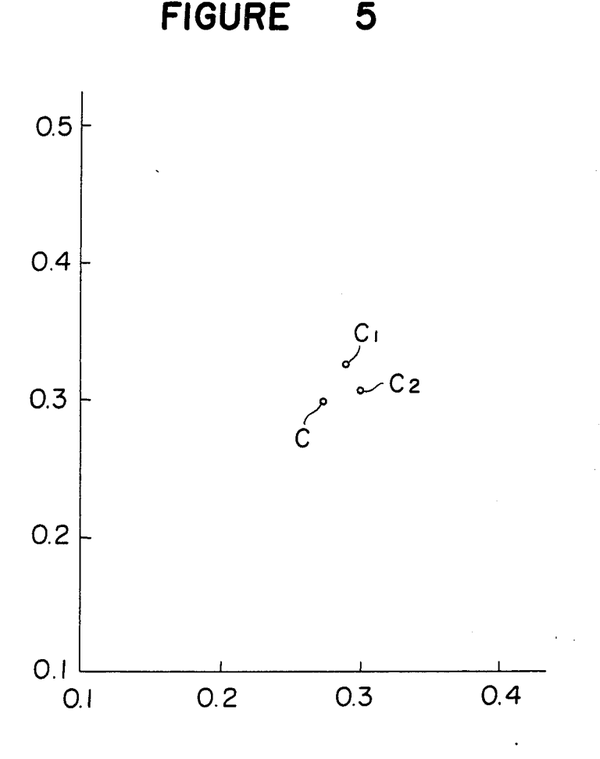
FIG. 5 is a CIE chromaticity diagram showing the emitting colors of the high resolution CRT of the present invention and the conventional high resolution CRT.

The chromaticity point of the cathode ray tube of the present invention was at $(x, y) = (0.277, 0.297)$ at point C in FIG. 5, and no substantial change was observed in the chromaticity point after the accelerated ageing test for 500 hours.

Whereas, in the case of the conventional cathode ray tube by means of the conventional phosphor, the coating characteristics of the green emitting component were inferior and it was necessary to use a ball mill for adequate mixing. Consequently, the cathode ray tube thereby obtained, showed an emitting color at $(x, y) = (0.292, 0.324)$ at point $C_1$ (due to the deterioration of the blue emitting component i.e. a sulfide as a result of the ball milling), while the emitting color should have been shown at point C. Further, this cathode ray tube was subjected to the ageing test for 500 hours, whereby color drift was observed with the chromaticity point shown at $(x, y) = (0.303, 0.305)$ at point $C_2$.

EXAMPLE 9

To 24 parts by weight of a green emitting phosphor obtained in Example 2, represented by the formula $(Zn_{0.99985}Na_{0.00015})_2SiO_4:Mn_{0.004}$, $As_{0.004}$, $Bi_{0.002}$ and having an after-glow period of 67 milliseconds, 11 parts by weight of a ZnS:Cu, Al green emitting phosphor was mixed to obtain a green emitting phosphor. A ZnS:Ag, Ga, Cl phosphor having an after-glow period of 30 milliseconds was used as a blue emitting phosphor. 34 Parts by weight of a $(Zn, Mg)_3(PO_4)_2:Mn$ phosphor having an after-glow period of 133 milliseconds and 14 parts by weight of a $Y_2O_2S:Eu$ phosphor were mixed to obtain a red emitting phosphor. These phosphors were applied onto a face plate to form phosphor dots, and a color cathode ray tube of the present invention was prepared in accordance with the conventional method for the preparation of color cathode ray tubes.

The color cathode ray tube of the present invention showed no substantial color drift or no substantial decrease of the luminance during the use for an extended period of time, as compared with the conventional color cathode ray tube.

What is claimed as new and desired to be secured by Letters Patent of the United States is:

1. A zinc silicate phosphor represented by the formula:

$$(Zn_{1-x-2y}, M^{II}_x, Na_{2y})_2SiO_4:Mn_a, As_b, M_c \quad (I)$$

where $M^{II}$ is at least one element selected from the group consisting of barium, calcium and strontium, M is at least one of antimony and bismuth, and x, y, a, b and c satisfy the conditions of $0 \leq x \leq 5 \times 10^{-2}$, $0 \leq 2y \leq 5 \times 10^{-3}$, $5 \times 10^{-5} \leq a \leq 3 \times 10^{-2}$, $0 \leq b \leq 5 \times 10^{-3}$ and $0 < c \leq 1 \times 10^{-2}$, respectively, provided $x + 2y \neq 0$, and exhibiting a higher fluorescence maintaining rate than said phosphor where $c = 0$, and a higher fluorescence maintaining rate than said phosphor where $x + 2y = 0$.

2. The zinc silicate according to claim 1, wherein M is antimony.

3. The zinc silicate phosphor according to claim 2, wherein $M^{II}$ is barium.

4. The zinc silicate phosphor according to claim 2, wherein $M^{II}$ is barium.

5. The zinc silicate phosphor according to claim 1, wherein b and c satisfy the conditions of $1\times 10^{-5}\leq b\leq 2\times 10^{-3}$ and $1\times 10^{-5}\leq c\leq 5\times 10^{-3}$.

6. The zinc silicate phosphor according to claim 1, wherein the value of 2y is $1\times 10^{-5}\leq 2y\leq 2\times 10^{-3}$.

7. An electron excited fluorescent display device having a fluorescent screen, wherein a zinc silicate phosphor represented by the formula:

$$(Zn_{1-x-2y}, M^{II}{}_x, Na_{2y})_2SiO_4:Mn_a, As_b, M_c \qquad (I)$$

where $M^{II}$ is at least one element selected from the group consisting of barium, calcium and strontium, M is at least one of antimony and bismuth, and x, y, a, b and c satisfy the conditions of $0\leq x\leq 5\times 10^{-2}$, $0\leq 2y\leq 5\times 10^{-3}$, $5\times 10^{-5}\leq a\leq 3\times 10^{-2}$, $0\leq b\leq 5\times 10^{-3}$ and $0<c\leq 1\times 10^{-2}$, respectively, provided $x+2y\neq 0$, and exhibiting a higher fluorescence maintaining rate than said phosphor where $c=0$ and a higher fluorescence maintaining rate than said phosphor where $x+2y=0$, is used as a green emitting component of the fluorescent screen.

8. The electron excited fluorescent display device according to claim 7, wherein the fluorescent screen comprises green, red and blue emitting phosphors having long after-glow characteristics, in which:

(I) the green emitting phosphor is composed essentially of a zinc silicate phosphor represented by the formula I and has a 10% after-glow period of from 5 to 150 milliseconds;

(II) the red emitting phosphor is composed essentially of a long after-glow red to orange emitting phosphor with a 10% after-glow period of at least 5 milliseconds and having a 10% after-glow period of from 5 to 150 milliseconds; and (III) the blue emitting phosphor is composed of a blue to bluish white emitting phosphor having a 10% after-glow period of from 5 to 150 milliseconds.

9. The electron excited fluorescent display device according to claim 8, wherein the red emitting phosphor is composed essentially of a phosphate phosphor represented by the formula:

$$(Zn_{1-z}, Mg_z)_3(PO_4)_2:Mn_i, M_j, M'_k \qquad (II)$$

where M is at least one element selected from the group consisting of calcium, strontium, barium, beryllium, zirconium and tin, M' is at least one of arsenic and lead, and i, j, k and z satisfy the conditions of $5\times 10^{-4}\leq i\leq 10^{-1}$, $0\leq j\leq 10^{-1}$, $0\leq k\leq 10^{-1}$ and $0\leq z<1$.

10. The electron excited fluorescent display device according to claim 8, wherein the blue emitting phosphor is composed essentially of a long after-glow blue to bluish white emitting sulfide phosphor represented by the formula:

$$ZnS:Ag, M_m, M', X \qquad (III)$$

where M is at least one of copper and gold, M' is at least one element selected from the group consisting of gallium, indium and scandium, X is at least one element selected from the group consisting of fluorine, chlorine, bromine, iodine and aluminum, and m is a positive numerical value including zero.

11. The electron excited fluorescent display device according to claim 7, wherein M is antimony.

12. The electron excited fluorescent display device according to claim 11, wherein $M^{II}$ is barium.

13. The electron excited fluorescent display device according to claim 11, wherein $M^{II}$ is calcium.

14. The electron excited fluorescent display device according to claim 7, wherein b and c satisfy the conditions of $1\times 10^{-5}\leq b\leq 2\times 10^{-3}$ and $1\times 10^{-5}\leq c\leq 5\times 10^{-3}$, respectively.

15. The electron excited fluorescent display device according to claim 7, wherein the value of 2y is $1\times 10^{-5}\leq 2y\leq 2\times 10^{-3}$.

* * * * *